May 29, 1928.   M. BARTHOLDY   1,671,220

PRECISION INDICATOR FOR GAUGE MEASURING

Filed June 24, 1924

Inventor:
Max Bartholdy,
By:

Patented May 29, 1928.

1,671,220

UNITED STATES PATENT OFFICE.

MAX BARTHOLDY, OF ESSEN, GERMANY, ASSIGNOR TO FRIED. KRUPP AKTIENGE-SELLSCHAFT, OF ESSEN-ON-THE-RUHR, GERMANY.

PRECISION INDICATOR FOR GAUGE MEASURING.

Application filed June 24, 1924, Serial No. 722,130, and in Germany August 6, 1923.

This invention relates to precision indicators such as are more particularly designed to be used in testing works to be ground.

Shafts, bolts and bores which should be ground, first have to be turned preparatorily to a measure being by 0.2 to 1.0 mm. greater or smaller than the desired measure and then finished by grinding them to the desired measure. The measuring range of the well-known precision indicators is much too small for such large grinding allowances.

Now, the invention has for its object to provide a precision indicator of the kind stated which has a comparatively large measuring range and permits a very accurate determination of the desired measurement.

Figure 2:
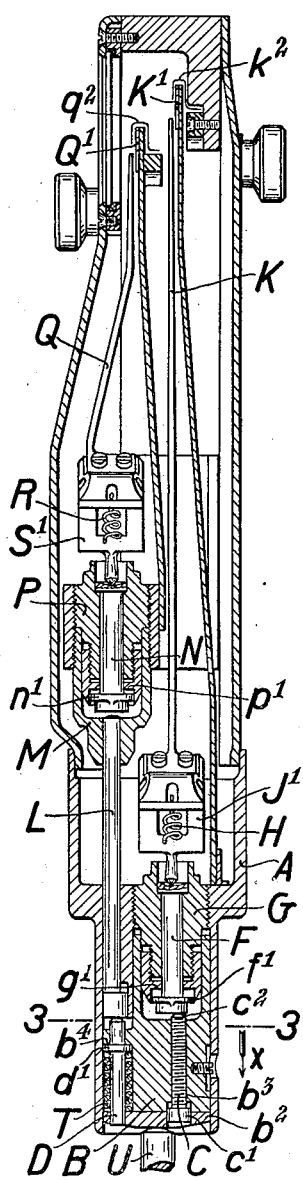
Figure 1:
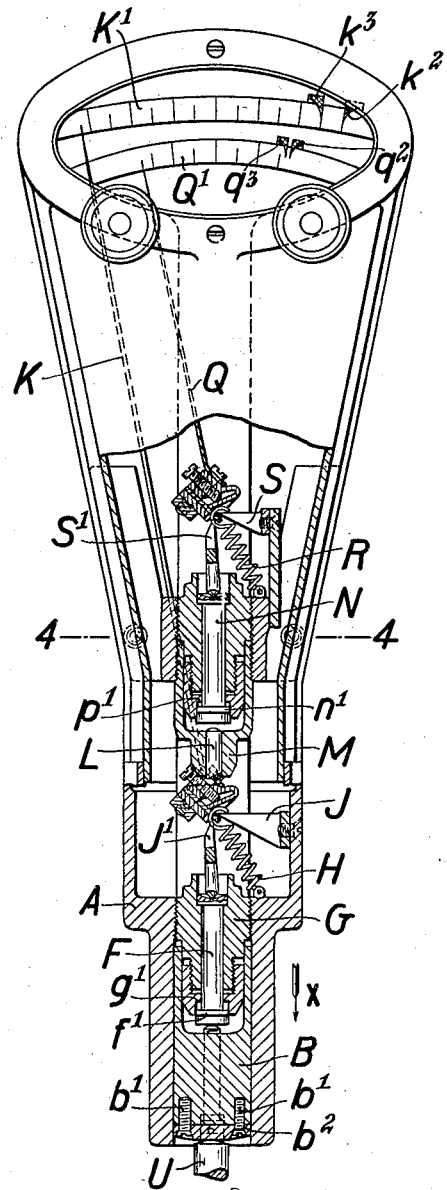
Figure 3:
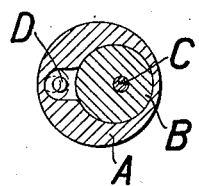
Figure 4:
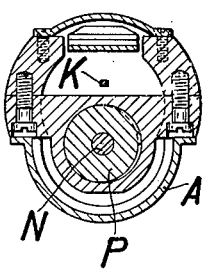

An embodiment of the subject-matter of the invention is illustrated, by way of example, in the accompanying drawing, in which Fig. 1 is a front elevation of the precision indicator partly in section, Fig. 2 is a central longitudinal section of the precision indicator, Fig. 3 is a section along the line 3—3 of Fig. 2, seen from above, and Fig. 4 is a section along the line 4—4 of Fig. 1, likewise seen from above.

A is a casing in which a bolt B is shiftable which has attached to it by means of screws $b^1$ (Fig. 1) a plate $b^2$ which is adapted to be placed into connection with the work to be gauged by the intermediary of a feeling bolt U in any suitable known manner. The bolt B is provided with a threaded bore $b^3$ (Fig. 2) receiving a set screw C the head $c^1$ of which projects into a corresponding bore of the plate $b^2$ so as to be easily accessible. The free end $c^2$ of the set screw C which extends beyond the bolt B abuts against an intermediate bolt F which is shiftably guided in a sleeve G. This bolt F is provided with a collar $f^1$ in the path of which is arranged a fixed stop $g^1$. In a manner shown for example in my prior Patent No. 1,425,438, August 8th, 1922 the bolt F supports a blade $J^1$ while a blade J is supported by the casing and between these two a pointer element K is mounted and retained in position by means of a spring H attached thereto and to the casing. There is further mounted for shifting motion in the bolt B a transmitting bolt D (Fig. 2) which is provided with a collar $d^1$. When the bolt D is in its position of rest, a spring T arranged between the feeling plate $b^2$ and the collar $d^1$ acts to hold the bolt D by one of the faces of the collar $d^1$ against a face $b^4$ of the bolt B. The inner end of the transmitting bolt D is in contact with one of the end faces of a bolt L which is shiftable in the direction of its axis and guided in the casing A and in a sleeve M carried by the said casing. In the position of the parts shown by the drawing, the other end face of the bolt L lies at a small distance from the end face of a coaxially arranged intermediate bolt N which is longitudinally shiftable in a guide P of the casing A. The intermediate bolt N is provided with a collar $n^1$ in the path of which lies a fixed stop $p^1$. By means of a blade S' supported on the bolt N, a blade S fixed to the casing and a spring R, the pointer Q is mounted for oscillation similarly to the assembly K, J, $J^1$, H. The spring T is stronger than the spring R. The pointers K and Q move over scales $K^1$ and $Q^1$, respectively. The ratio of transmission between the two registering systems can be adjusted by adjusting the distance between the fixed and movable blades J, J' or S, S', or both of them, in the manner shown in my said prior Patent No. 1,425,438. The adjustment is chosen so that, when the same shifting motion is imparted to both bolts, the deflection of the small pointer Q will be much larger than that of the large pointer K. Both scales $K^1$ and $Q^1$ are provided with pointer marks $k^2$ $k^3$ and $q^2$ $q^3$ of known design and adapted to be adjusted in a suitable manner, for example as shown in U. S. Patent No. 1,422,169.

For measuring, the precision indicator is affixed in well-known manner to a gauge and placed, by the intermediary of the feeling bolt U, into engagement with the piece to be worked so that the bolt B will be shifted with relation to the casing A in accordance with the progression of the working.

When the precision indicator is used in a rider gauge, the feeling bolt U and therefore also the bolt B will be shifted further into the casing A in accordance with the progression of the working. In this case, the screw C must be adjusted previous to the beginning of the grinding in such a manner as to cause the large pointer K to take its position in front of the right-hand end mark of the scale K¹ when the small pointer Q registers with the right-hand end mark of its scale Q¹. In the position of rest, both pointers are then at the left-hand end of their corresponding scales and a small space exists between the upper end of the bolt L and the lower end of the intermediate bolt N (Fig. 2). Every shifting movement of the bolt B is transmitted by means of the screw C to the intermediate bolt F which, by the intermediary of the blade J¹, rocks the pointer K in clockwise direction around the stationary blade J contrary to the action of the spring H so that the pointer will move over the scale K¹ from the left to the right. Owing to the space existing between the bolts L and N the pointer Q will remain, at first, in its left-hand end position. Only upon the pointer K reaching a position near the right-hand end mark of its scale K¹, will the bolt L have been shifted by the transmitting bolt D so far upwardly that it will come into contact with the bolt N. This is the case when the preparatory grinding has been terminated. Upon continuing the grinding the pointer Q is likewise rocked in clockwise direction around the blade S by means of the blade S¹, contrary to the action of the spring R. The reading now takes place at the scale Q¹. Thus, the less sensitive large pointer K serves to test the dimensions of the work during the preparatory grinding and the small pointer Q which indicates with a much greater accuracy, serves to effect the testing during the finishing grinding without it being necessary to alter the adjustment of the gauge during the working operation.

When using the precision indicator in a hole or caliper gauge, the feeding bolt B will shift during the progressive working of the piece in the direction of the arrow x through the intermediary of suitable transfer members which may be constructed in the manner illustrated in Patent No. 1,048,073. In this case, the screw C must be adjusted before the beginning of the working in such a manner as to cause both pointers to simultaneously register with the left-hand end mark of their scales. If the indicator is then put on the work which has been turned preparatorily but not yet ground, the bolt B will be shifted into the casing so that both pointers will first move from the left to the right. The small pointer Q will reach the right-hand end mark of its scale Q¹ when the large pointer K will have moved only by a small distance from the left-hand end mark of its scale K¹. Upon the bolt B being shifted further inwardly, the collar n¹ of the intermediate bolt N will strike against the stop p¹ so that any further shifting of the bolt N is prevented. Therefore the transmitting bolt D can no longer be carried along by the bolt B, but the bolt B will be shifted with relation to the bolt D contrary to the action of the spring T. If the working of the work-piece is now begun, the small pointer Q will at first be held by the action of the spring T at the right-hand end of the scale Q¹, while the large pointer K will immediately move towards its left limit position. The bolt B shifts further and further in the direction of the arrow x, while the transmitting bolt D remains in connection with the intermediate bolt N by the action of the spring T and through the intermediary of the bolt L. As soon as the working has progressed so much and the bolt B shifted so far as to cause the reengagement of the collar d¹ of the transmitting bolt D with the stop face b⁴ of the bolt B, the small pointer Q will likewise begin its movement from the right to the left. The reading now takes place at the scale Q¹. The pointer marks k² k³ and q² q³ may be used for adjusting, previous to the working, the limits of the accuracy to be observed for each of the two measuring-systems. In using the subject-matter of the invention in a hole or caliper gauge, it is therefore also possible to employ the less sensitive measuring system for the testing during the preparatory grinding and the much more accurately indicating other measuring-system during the finishing grinding without it being necessary to alter the adjustment of the gauge.

In comparison with precision indicators having only one measuring-system the subject-matter of the invention therefore offers the advantage of allowing the dimensions of the work to be watched during the entire working operation with only one implement and the desired measure to be reached with the greatest accuracy in spite of the comparatively large over- or undermeasure, respectively. As a matter of course, still other measuring systems of different sensibilities may be arranged in the common casing. Besides, the adjustment of the precision indicator may be effected by screws with knurled heads or the like which are accessible from the outside and adapted to be adjusted by hand.

I claim:

1. In a precision indicator of the type described, a plurality of movable pointers, a slidable bolt adapted to be moved by a feeding mechanism, and rectilinearly displaceable transmission means interposed between said bolt and the respective pointers and operable directly upon the latter, said transmission means being constructed to impart to said pointers different degrees of movement for a given movement of said bolt.

2. In a precision indicator of the type described, a plurality of movable pointers, scales for said pointers, a slidable bolt adapted to be moved by a feeling mechanism, transmission means between said bolt and the respective pointers, said transmission means being constructed to impart to said pointers different degrees of movement for a given movement of said bolt, and means for relatively adjusting said pointers to cause them to indicate a given value on said scales simultaneously.

3. In a precision indicator, a plurality of movable pointers, a slidable bolt adapted to be moved by a feeling mechanism, and transmission means between said bolt and the respective pointers, one of said transmission means including a lost motion connection for permitting initial movement of said bolt without effect upon one of said pointers, said transmission means being constructed to impart to said pointers different degrees of movement for a given movement of said bolt.

4. In a precision indicator of the type described, a pair of movable pointers, a slidable bolt adapted to be moved by a feeling mechanism, and independent transmission means between said bolt and said pointers, one of said transmission means being adjustable for altering the relative positions of the pointers, said transmission means being constructed to impart to said pointers different degrees of movement for a given movement of said bolt.

5. In a precision indicator of the type described, two movable pointers, a slidable bolt adapted to be moved by a feeling mechanism, independent transmission means inserted between said bolt and each of said pointers, one of said transmission means being constructed to impart to its pointer a greater degree of movement for a given movement of said bolt than the other transmission means said first mentioned transmission means having a yieldably supported transmision element.

6. In a precision indicator, two movable pointers, a slidable bolt adapted to be moved by a feeling mechanism, independent transmission means interposed between said bolt and each of said transmission means being constructed to impart to its pointer a greater degree of movement for a given movement of said bolt than the other transmission means, said first mentioned transmission means including a lost motion connection and a yieldably supported transmission element for permitting initial movement of said bolt in either direction without effect upon said first mentioned pointer.

7. In a precision indicator, two movable pointers, a slidable bolt adapted to be moved by a feeling mechanism, a transmission device constantly in operative position between one of said pointers and said bolt, and a second transmission means interposed between the other pointer and said bolt, comprising a lost motion device for permitting an initial movement of said bolt without moving said second mentioned pointer, and for operatively connecting the two upon continued motion of said bolt, said second mentioned transmission device being constructed to impart to its pointer a greater degree of movement for a given movement of said slidable bolt than said first mentioned transmission device.

8. In a precision indicator, two movable pointers, a slidable bolt adapted to be moved by a feeding mechanism, independent rectilinearly movable transmission means interposed between said bolt and the respective pointers, one of said transmission means being constructed to impart to its pointer a greater degree of movement for a given movement of said bolt than the other, stops for limiting the movements of said transmission means, said first mentioned transmission means including a lost motion connection, and means for varying the length of the other transmission means.

9. In a precision indicator, two movable pointers, a slidable bolt adapted to be moved by a feeling mechanism, independent rectilinearly movable transmission means interposed between said bolt and the respective pointers, one of said transmission means being constructed to impart to its pointer a greater degree of movement for a given movement of said bolt than the other, stops for limiting the movements of said transmission means, said first mentioned transmission means comprising a slidable rod, a pin yieldably supported in said bolt for moving said rod, and a stop for limiting the movement of said pin, and means for varying the length of the other transmission means.

10. In a precision indicator of the type described, a plurality of movable pointers, a slidable bolt adapted to be moved by a feeling mechanism, and transmission means interposed between said bolt and the respective pointers, one of said transmission means including means for permitting initial movement of said bolt without effect upon the corresponding pointer, said transmission means being constructed to impart to said pointers different degrees of movement for a given movement of said bolt.

The foregoing specification signed at Essen, Germany, this 28th day of May, 1924.

MAX BARTHOLDY.

CERTIFICATE OF CORRECTION.

Patent No. 1,671,220.  Granted May 29, 1928, to

MAX BARTHOLDY.

It is hereby certified that error appears in the printed specification of the above numbered patent requiring correction as follows: Page 2, lines 119 and 120, claim 1, for the word "feeding" read "feeling"; page 3, line 43, claim 5, for the misspelled word "transmision" read "transmission"; same page, line 48, claim 6, after the word "said" insert the words "pointers, one of said" and line 77, claim 8, for the word "feeding" read "feeling"; and that the said Letters Patent should be read with these corrections therein that the same may conform to the record of the case in the Patent Office.

Signed and sealed this 19th day of June, A. D. 1928.

(Seal)

M. J. Moore,
Acting Commissioner of Patents.